United States Patent
Cox

Patent Number: 5,819,981
Date of Patent: Oct. 13, 1998

[54] APPARATUS FOR DISTRIBUTING ARTICLES

[76] Inventor: Wiley N. Cox, 11155 Morrison, Dallas, Tex. 75229

[21] Appl. No.: 622,027

[22] Filed: Mar. 26, 1996

[51] Int. Cl.[6] .................................................. G07F 11/00
[52] U.S. Cl. ...................................... 221/2; 221/5
[58] Field of Search .................. 221/1, 2, 5, 7, 221/15, 92, 130

[56] References Cited

U.S. PATENT DOCUMENTS

| | | | |
|---|---|---|---|
| 4,598,810 | 7/1986 | Shore et al. | 221/5 |
| 4,635,053 | 1/1987 | Banks et al. | 221/2 |

Primary Examiner—Kenneth Noland
Attorney, Agent, or Firm—W. J. Scherback

[57] ABSTRACT

A computer controlled dispensing system including a first unit having a plurality of compartments for containing articles to be dispensed. A second unit includes larger compartments for containing articles of a size larger than the dimensions of the compartments in the first unit. Each compartment of the second unit including a locking mechanism. Some of the compartments of the first unit being programmed to receive and dispense means to operate the locking mechanisms to gain access to articles stored in the compartments of the second unit. A key pad associated with the first unit. A computer. Means are provided for inputting codes to the computer via the key pad to access the contents of a selected compartment of the first unit to dispense one of the means to operate a selected one of the locking mechanisms.

5 Claims, 4 Drawing Sheets

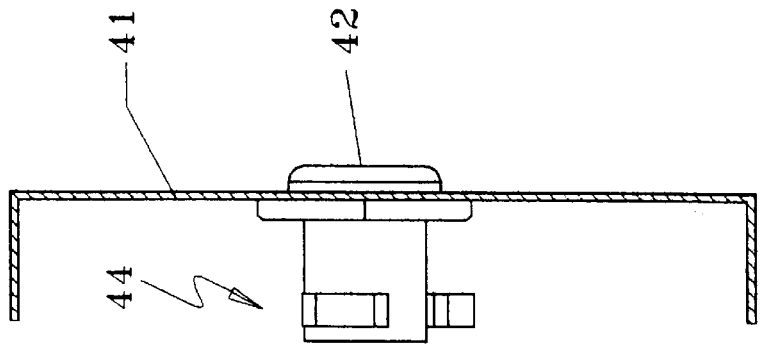
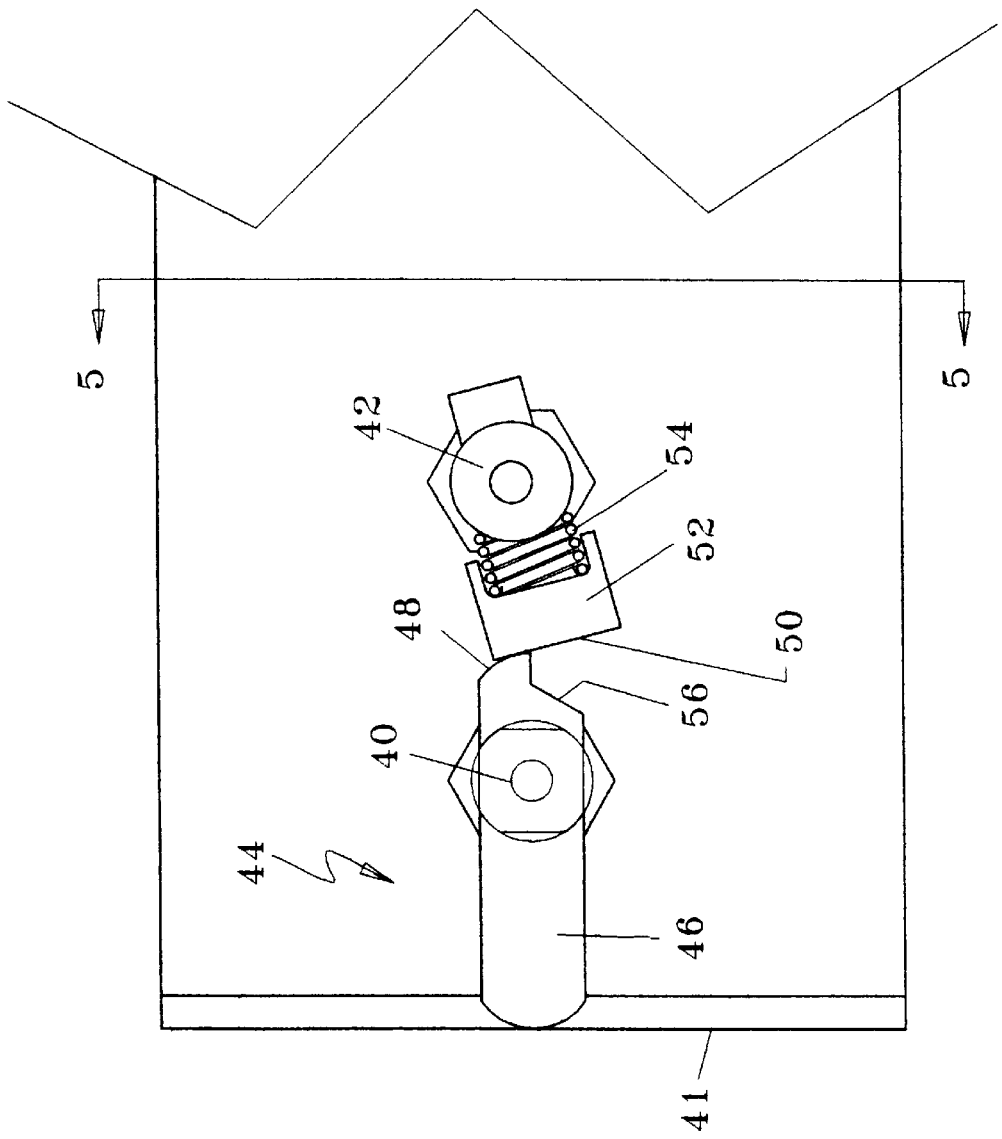
FIG. 5
FIG. 4

APPARATUS FOR DISTRIBUTING ARTICLES

BACKGROUND OF THE INVENTION

1. Field of the Invention

This invention relates to methods and apparatus for dispensing authorization mechanisms such as cards, keys and the like for gaining access to storage devices to acquire tools, medications and other materials for which records are to be kept identifying the acquirer and other data necessary for proper inventory control.

2. Discussion of the Prior Art

There are many article dispensing systems available in the market at this time. Some dispense packaged foods such as candies while others, as described in U.S. Pat. No. 4,598,810 dispense Video Cassettes. In the latter system a record is maintained of the identity of the patron and the item dispensed. The system of the above patent is said to be applicable to the dispensing of small tools, which like the Video Cassettes, are reusable. To that end provision is made to accept the return of the tool or Cassette and credit the patron with the return.

One of the most advanced tool dispensing systems available today is the Cox Tool Control System (CTCS) sold or leased by Production Tool Sales of Dallas, Tex. It is a revamped vending machine with an electronic keyboard on it. It is used to dispense small items, like carbide inserts and other expendable tools, to shop workers and can be placed next to the shop machines, eliminating the need for repeated trips to a tool crib. A worker seeking an item must punch in the item number, employee number and a job number. Associated with the machine is a computer programmed to compile information from the machine into a variety of different formats, including usage by job, by employee by day; just about any breakdown desired. However none of the prior art dispensing systems have provision for the dispensing of large tools, such as band saw blades and the like. Accordingly there exists a need, satisfied by the present invention, to provide access to larger tools and equipment while maintaining the control and record keeping of systems such as the CTCS.

In view of the foregoing, it is an object of the present invention to provide a dispensing system that issues authorization means, such an cards or keys that enable a patron to access larger tools and equipment from a secured source.

SUMMARY OF THE INVENTION

In accordance with the present invention, there is provided a computer controlled dispensing system including a first unit having a plurality of compartments for containing articles to be dispensed. A second unit includes a plurality of larger compartments for containing articles of a size larger than the dimensions of the compartments in the first unit. Each compartment of the second unit has a locking mechanism for securing the compartment from access. Some of the compartments of the first unit are programmed to dispense means to operate the locking mechanism to gain access to articles therein. A key pad is associated with the first unit. A computer. The key pad is connected to the computer to input codes which will cause a selected compartment of the first unit to dispense the means to operate the locking mechanism to gain access to a compartment of the second unit.

In a preferred embodiment the means to operate the locking mechanism is a key. In the alternative the means to operate the locking mechanism is a magnetically encoded card.

The present invention also contemplates a method of operating a computer controlled dispensing system including first and second banks of compartments which includes the steps of inputting to the computer a code via a key pad at the first bank to identify the user of the system. The code is verified to identify the user as authorized to use the system. Additional codes are input via the key pad to the computer to identify the article to be dispensed, and acquiring the dispensed article to gain access to a selected compartment of the second bank.

BRIEF DESCRIPTION OF THE DRAWING

FIG. 4 illustrates a locking mechanism, which in accordance with the present invention retains the key when it is used to access a compartment of the bay of FIG. 2; and FIG. 5 is another view of the locking mechanism of FIG. 4.

DETAILED DESCRIPTION

Figure 1:
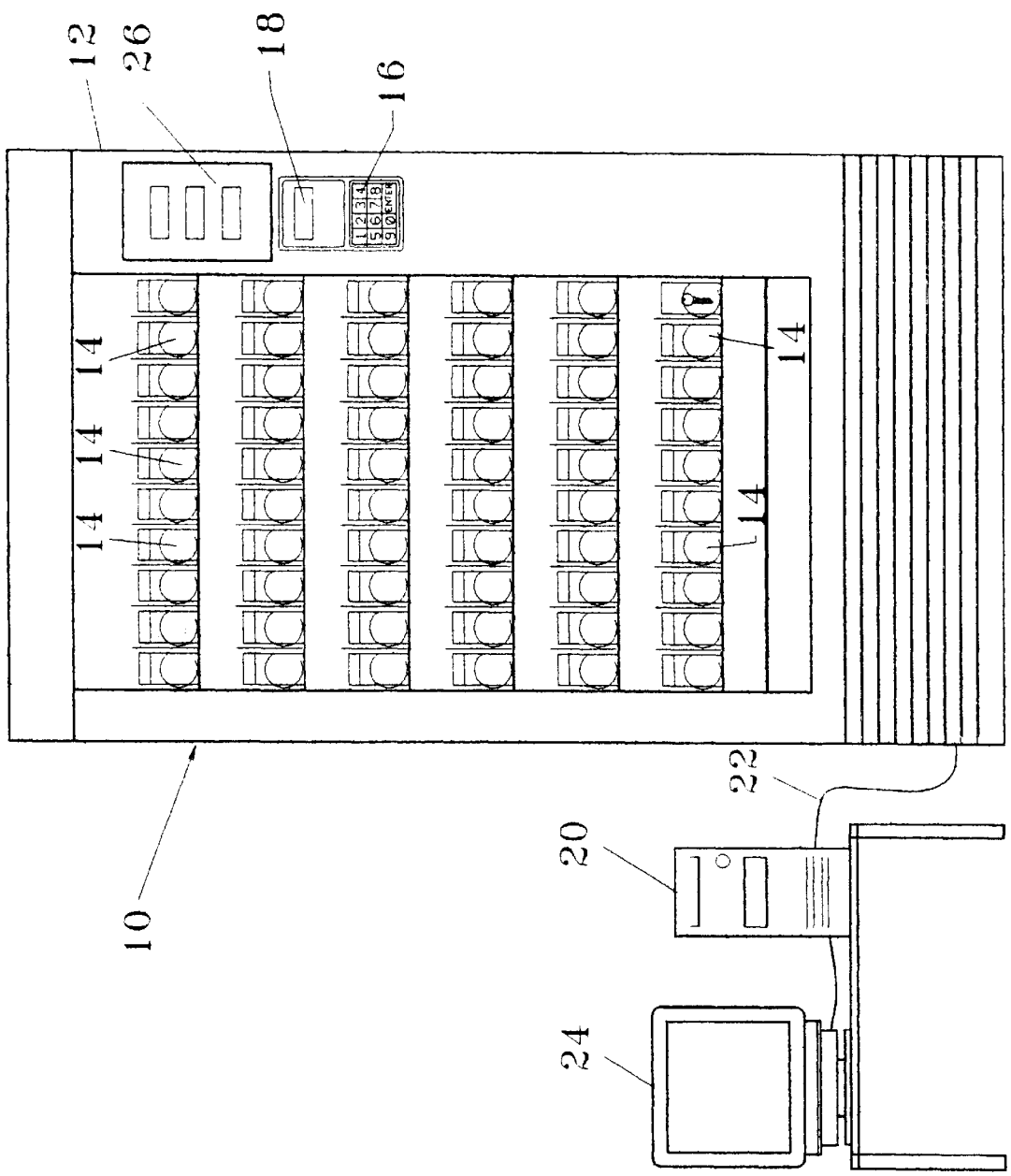
FIG. 1 is a front view of a computer controlled dispensing system embodying features of the present invention.

Referring now to the drawing, and specifically to FIG. 1, where there illustrated a computer controlled dispensing system 10 embodying features of the present invention. The dispensing system for the most part is a based upon a "Cox Tool Control System" available commercially from Production Tool Sales of Dallas, Tex. As will become apparent, the "Cox Tool Control System" is capable of many diverse uses in the dispensing of varied articles including medical supplies. The dispensing system comprises a computer controlled dispenser 12 including a plurality of compartments 14 each containing an article to be dispensed. Where the dispensing system 10 is used in a manufacturing environment the articles to be dispensed would include, without limitation, cutting tools, MRO supplies, component parts and gages. Where used in a medical environment, such as a hospital the articles to be dispensed would include, without limitation, drugs, other medications and medical supplies.

The system 10 includes a key pad 16 for entering data and an LCD screen 18 for visually displaying the data as it is being entered. The entered data is sent to a computer CPU 20 over conductors 22 or by way of a modem (not shown). The data is displayed on a monitor 24.

A user enters an identifying code via the key pad 10 or through the use of a magnetic card or a similar medium scanned by reader. The users identity is verified by the computer 20 which then instructs the user to enter additional information via the key pad 16 to make a selection of the item to be dispensed. A transaction record is made each time the user has an article or item dispensed. A typical transaction record includes:

Reorder Reports (1) Full bin status report
(2) Requirement report

-continued

Summary Reports (1) Employee report        (2) Department report
(3) Machine report         (4) Job report
(5) Inventory report
Transaction Reports (1) List by employee       (2) List by machine
(3) List by job            (4) List by department
(5) List by date           (6) List by station
(7) List by item
Inventory Reports (1) Master inventory       (2) Price list by price
(3) Price list by cost     (4) Value report by price
(6) Value report by cost   (6) Inventory profit The system 10 is controlled by software using the Windows operating system for ease of use. The writing of the software or program for the system is routine for a programmer of ordinary skill in the art and need not be set forth here.

Tools are stored at the job site in the automatic vending machine 12. Tools are dispensed as needed by a machine operator-employee. This not only saves trips to the crib and reduces machine down time but also records which employee used which tools on which job or department and on which day. This information is stored in the CPU 20 which produces cost accounting reports as required.

Where the system is utilizes in a hospital environment the inputs would include a code identifying the doctor, a code identifying the user, typically a nurse or nurse's aide and a code identifying the patient on behalf of whom the articles are being withdrawn. The control system will afford a hospital with controls over medication and its administration. This will be a boon to those hospitals which suffer losses of drugs and the like.

Figure 2:
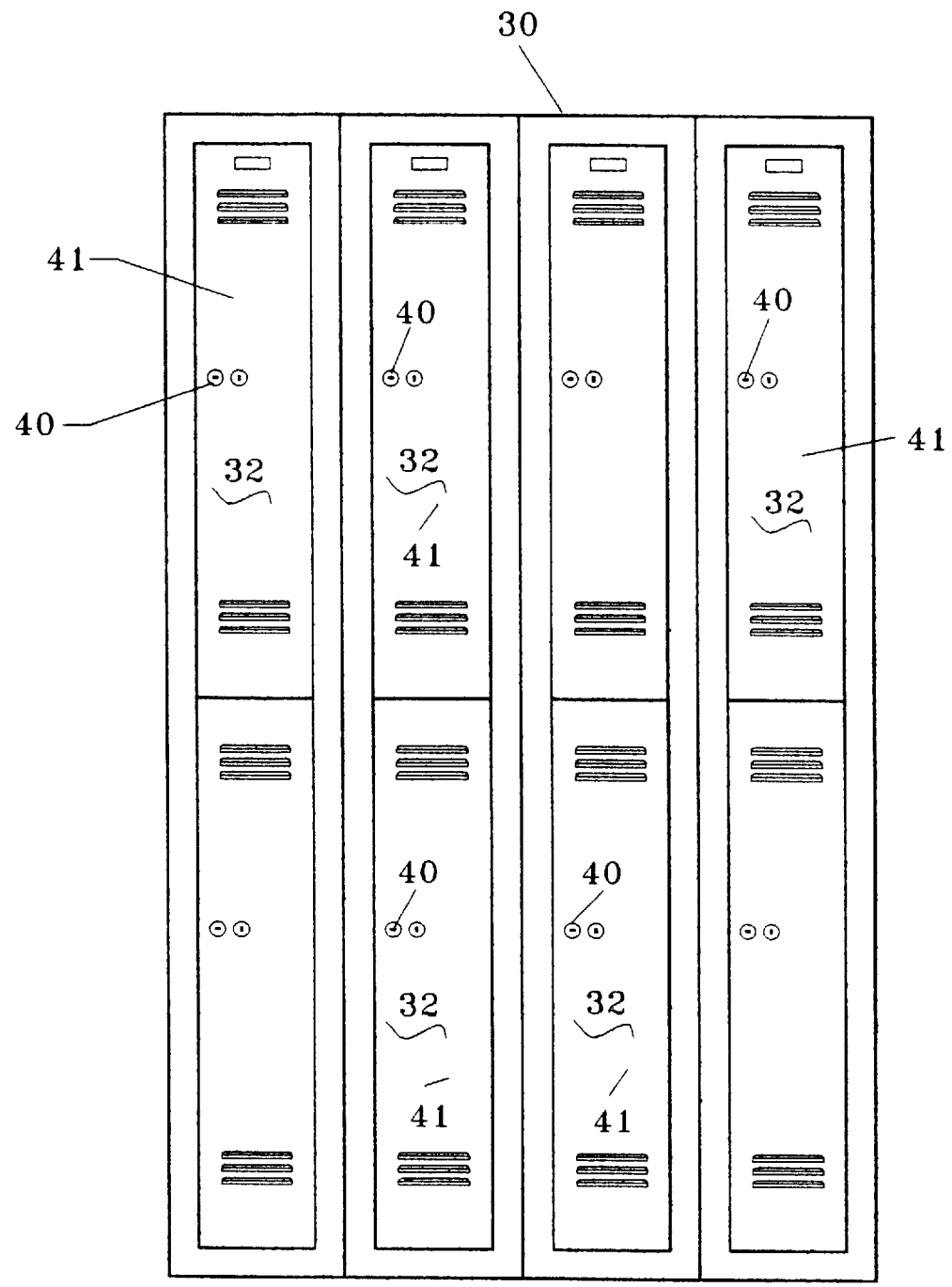
FIG. 2 Illustrates a bay of large compartments for dispensing articles under the control of the system of FIG. 1.
Figure 3:
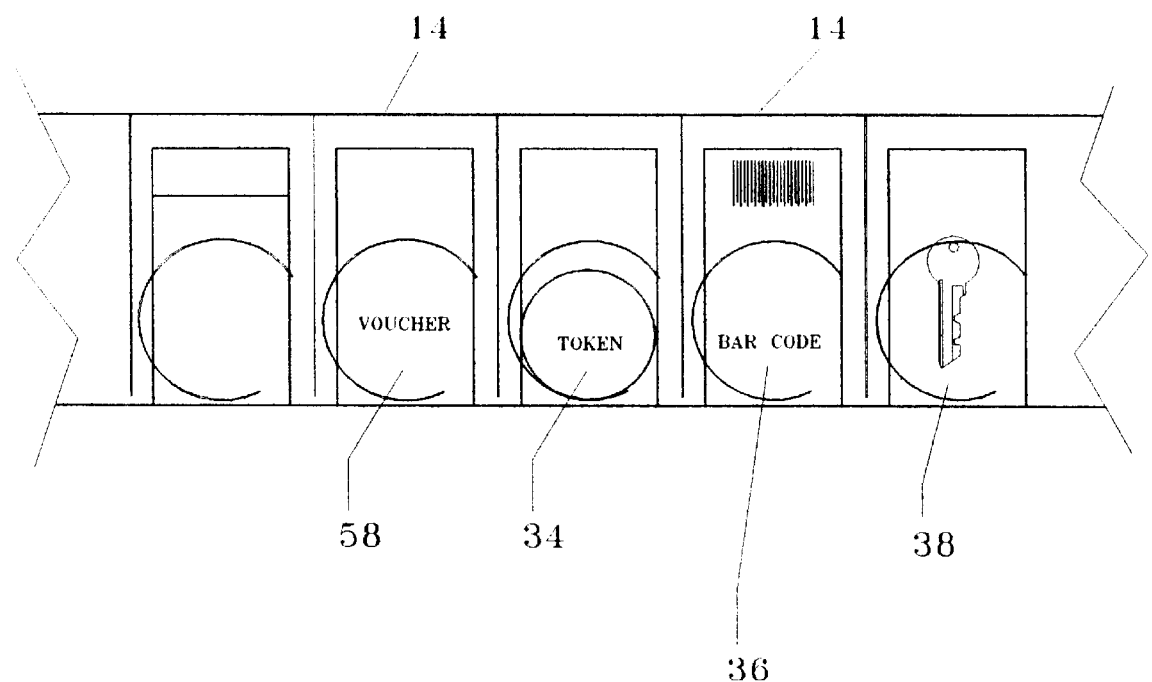
FIG. 3 is an enlarged representation of some of the compartments of FIG. 1 illustrating the presence of a key to be dispensed and used to access a compartment of the bay of FIG. 2.

Further in accordance with the present invention, provision is made to dispense articles of a size that are too large to be received by the small compartments 14. To this end there is provided (FIG. 2) a free-standing cabinet 30 having a plurality of compartments 32, each containing one of the larger articles and located in the vicinity of the dispensing unit 12. Where tools are involved the larger articles would include large grinding wheels, chuck jaws, sanding belts, etc.. Where hospital supplies are involved the larger articles would include bed pans, water pitcher, facial tissue, etc.. Access to the compartments may be by way of various media, including tokens, keys or bar code encoded cards each to be dispensed by the unit 12 in accordance with properly coded inputs via the keypad 16. These access devices are illustrated in FIG. 3 within enlarged portion of the compartments 14 to include the token 34, the bar code encoded card 36 and the key 38. These access devices may be replicated in as many of the compartments as may be required. The cabinet may be replicated such that a plurality of them would be located in the vicinity of the dispensing unit 12. In addition the compartments 30 may be sized to accommodate the article to be dispensed.

While various forms of access devices have been disclosed the access device of choice is the key 38. It will be dispensed by the unit 12 pursuant to proper input codes via the key pad to open a locked compartment 32 containing the selected article. The key is received by one of a number of tumblers 40 to open a door 41 to the compartment 32 and thus gain access to the article within the compartment 32. Once the key is used to unlock the door it is retained in the tumbler 40 until such time as a second key, a master, is inserted in a tumbler 42. The second key is used when the compartment is to be replenished.

The means for accomplishing the foregoing is a locking-release mechanism 44 illustrated in FIGS. 4 and 5. The mechanism 44 comprises a cam 46 mounted to be rotated by rotation of tumbler 40 actuated by the key 38. The cam includes an end portion 48 engaging and thus locking the door 41. An opposite end 48 of the cam engages a face 50 of a bolt 52. The bolt is loaded by spring 54. As the key rotates the cam 46, the end 46 moves past the end of the face 50 of bolt 52 and the spring moves the face of the bolt 52 into engagement with a shoulder 56 of cam 46. In this position the key is unable to rotate the tumbler 40 to be withdrawn. At such time as replenishment is made to the compartments 32 the master key is inserted into tumbler and rotation of the tumbler causes the bolt to be moved back against the force of the spring 54. The cam is now free to be rotated to its shown position and the key may now be withdrawn and restored to its proper compartment in the dispenser 12.

Where it is desired to use a tool crib for dispensing large articles the dispenser 12 can issue, upon proper coding via the key pad 16, a voucher 58 (FIG. 3). The voucher is then taken to the tool crib and the requested tool issued to the user.

Now that the invention has been described, modifications may occur to those skilled in the art and it intended that such modifications be covered as fall within the scope of the appended claims.

What is claimed is:

1. A computer controlled dispensing system including a first unit having a plurality of compartments for containing articles to be dispensed, a second unit including larger compartments for containing articles of a size larger than the dimensions of the compartments in said first unit, each said compartment of said second unit being provided with a locking mechanism, at least some of said compartments of said first unit programmed to accommodate means to operate said locking mechanisms to gain access to articles therein, a key pad associated with said first unit, a computer, and means for inputting data to said computer via said keypad to access the content of a selected compartment of said first unit to dispense one of said means to operate a selected one of said locking mechanism.

2. A computer controlled dispensing system including a first unit having a plurality of compartments for containing articles to be dispensed, a second unit including larger compartments for containing articles of a size larger than the dimensions of the compartments in said first unit, each said compartment of said second unit being provided with a locking mechanism, at least some of said compartments of said first unit programmed to accommodate means to operate said locking mechanisms to gain access to articles therein, a key pad associated with said first unit, a computer, means for manually actuating said keypad by a user to input data to said computer as to the identity of the user, and means for verifying the authority of the user to access any compartment of said first unit whereupon said user may continue to input data via said keypad to make a selection of the article to be dispensed or said means to operate a selected one of said locking mechanisms.

3. The computer controlled dispensing system of claim 1 wherein said locking mechanisms are key operated locks and said means to operate a selected one of said locking mechanisms is a key, said locking mechanisms being provided with means for retaining said key once the mechanism is actuated and also provided with a tumbler to receive a second key, the operation of which will permit the first named key to be withdrawn at the time the compartment is replenished.

4. The computer controlled dispensing system of claim 1 wherein said locking mechanism includes a magnetic code reader and said article to be dispensed is a magnetically encoded card which when inserted into said reader affords access to a selected one of said larger compartments.

5. The computer controlled dispensing system of claim 3 wherein said locking mechanism includes a cam having one end for engagement with an element of a door closing one of said larger compartments, an opposite end of said cam including a shoulder, said cam being rotated by said first mentioned key to release said door, a spring pressed bolt movable to engage said shoulder to prevent rotation of said first mentioned key and thus prevent withdrawal of said key, said second key operative to retract said bolt from engagement with said shoulder to permit rotation of said cam and withdrawal of said first mentioned key.

* * * * *